US012793992B2

(12) United States Patent
Kraft et al.

(10) Patent No.: US 12,793,992 B2
(45) Date of Patent: Nov. 10, 2026

(54) BIPOLAR PLATE FOR AN ELECTROCHEMICAL DEVICE

(71) Applicant: EKPO FUEL CELL TECHNOLOGIES GMBH, Dettingen (DE)

(72) Inventors: Jürgen Kraft, Metzingen (DE); Michael Götz, Dettingen (DE); Manuel Morcos, Tübingen (DE)

(73) Assignee: EKPO Fuel Cell Technologies GmbH, Dettingen (DE)

( * ) Notice: Subject to any disclaimer, the term of this patent is extended or adjusted under 35 U.S.C. 154(b) by 837 days.

(21) Appl. No.: 17/953,102

(22) Filed: Sep. 26, 2022

(65) Prior Publication Data

US 2023/0016017 A1 Jan. 19, 2023

Related U.S. Application Data

(63) Continuation of application No. PCT/EP2021/058181, filed on Mar. 29, 2021.

(30) Foreign Application Priority Data

Mar. 31, 2020 (DE) ..................... 10 2020 108 945.7

(51) Int. Cl.
*H01M 8/0267* (2016.01)
*H01M 8/0258* (2016.01)

(52) U.S. Cl.
CPC ....... *H01M 8/0267* (2013.01); *H01M 8/0258* (2013.01)

(58) Field of Classification Search
CPC ............. H01M 8/0206; H01M 8/0228; H01M 8/0258; H01M 8/0267; H01M 8/0273; H01M 8/241; H01M 8/2483; Y02E 60/50
See application file for complete search history.

(56) References Cited

U.S. PATENT DOCUMENTS 6,099,984 A * 8/2000 Rock .................. H01M 8/0247 429/492
2010/0136452 A1 6/2010 Bang et al.
(Continued)

FOREIGN PATENT DOCUMENTS

DE 102006056468 7/2007
DE 102014221351 4/2016
DE 102017118143 2/2018

OTHER PUBLICATIONS

International Search Authority, "International Preliminary Report on Patentability," issued in connection with PCT international application No. PCT/EP2021/058181, dated Oct. 13, 2022, 15 pages, with English translation.
(Continued)

*Primary Examiner* — Tiffany Legette
*Assistant Examiner* — Jared Hansen
(74) *Attorney, Agent, or Firm* — Hanley, Flight & Zimmerman, LLC

(57) ABSTRACT

In order to create a bipolar plate for an electrochemical device, comprising at least one first bipolar plate layer and one second bipolar plate layer, between which an edge channel extending along a longitudinal direction is formed, and comprising a fluid channel running substantially in parallel to the edge channel, in which bipolar plate at least an edge channel portion of the edge channel can be flowed through by a fluid media to be supplied to the electrochemical device, for example by a fluid reaction media or by a cooling media, even though the edge channel has no direct fluidic connection to a medium channel by which the respective fluid media is supplied to the electrochemical device, it is proposed that the bipolar plate comprises at least one fluidic connection through which a fluid medium can
(Continued)

flow from the edge channel into the adjacent fluid channel and/or from the adjacent fluid channel into the edge channel.

6 Claims, 10 Drawing Sheets

(56) References Cited

U.S. PATENT DOCUMENTS

| | | | | |
|---|---|---|---|---|
| 2017/0012301 | A1* | 1/2017 | Kraft | H01M 8/241 |
| 2017/0317361 | A1 | 11/2017 | Zillich et al. | |
| 2018/0048012 | A1 | 2/2018 | Beutel et al. | |
| 2018/0102554 | A1* | 4/2018 | Stahl | H01M 8/2483 |

OTHER PUBLICATIONS

German Patent Office, "Search Report," issued in connection with German Patent Application No. 102020108945.7, dated Jan. 5, 2021, 18 pages, with English translation.

International Search Authority, "International Search Report and Written Opinion," issued in connection with International Patent Application No. PCT/EP2021/058181, dated Jun. 25, 2021, 11 pages, with English translation.

* cited by examiner

BIPOLAR PLATE FOR AN ELECTROCHEMICAL DEVICE

RELATED APPLICATIONS

This application is a continuation of international application number PCT/EP2021/058181 filed on 29 Mar. 2021 and claims the benefit of German application number 10 2020 108 945.7 filed on 31 Mar. 2020.

The present disclosure relates to the subject matter disclosed in international application number PCT/EP2021/058181 of 29 Mar. 2021 and German application number 10 2020 108 945.7 of 31 Mar. 2020, which are incorporated herein by reference in their entirety and for all purposes.

FIELD OF THE DISCLOSURE

The present invention relates to a bipolar plate for an electrochemical device that comprises at least one first bipolar plate layer and one second bipolar plate layer, between which an edge channel extending along a longitudinal direction is formed, and comprises a fluid channel running substantially in parallel to the edge channel.

When such a bipolar plate is provided with a flow port through which a fluid reaction medium flows into a flow field formed on the bipolar plate, the edge channel is thus not flowed through by a fluid medium, because a weld seam around the region of the flow port separates the edge channel from the media inflow.

SUMMARY OF THE INVENTION

In accordance with an embodiment of the invention, a bipolar plate of the kind described at the outset is created in which at least one edge channel portion of the edge channel can be flowed through by a fluid medium to be supplied to the electrochemical device, for example by a fluid reaction medium or by a cooling medium, even though the edge channel has no direct fluidic connection to a medium channel through which the respective fluid medium is supplied to the electrochemical device.

In accordance with an embodiment of the invention, provision is made in a bipolar plate with the features of the preamble of claim 1 that the bipolar plate comprises at least one fluidic connection, through which a fluid medium can flow from the edge channel into the adjacent fluid channel and/or from the adjacent fluid channel into the edge channel.

Underlying the present invention is thus the concept of providing a fluidic connection to an edge channel portion separated from the media supply in order to be able to use the edge channel portion in a targeted manner for distributing a fluid medium in the inside space of the bipolar plate and/or in the flow fields formed on the outside of the bipolar plate.

In order to be able to set the flow of the fluid medium flowing through the edge channel to the electrochemically active regions of an electrochemically active unit adjacent to the bipolar plate in a targeted manner, provision may be made that the edge channel is provided with one or more constrictions and/or with one or more interruptions.

In a particular embodiment of the invention, provision is made that the fluid channel is of closed configuration relative to an electrochemically active unit of the electrochemical device.

In this case, the edge channel can preferably be flowed through by a cooling medium in the operation of the electrochemical device.

The fluidic connection preferably comprises a connecting channel that is delimited by the first bipolar plate layer and the second bipolar plate layer, wherein the first bipolar plate layer and the second bipolar plate layer in the region of the connecting channel are spaced at a distance from one another along a stack direction of the electrochemical device, along which the bipolar plates and the electrochemically active units of the electrochemical device succeed one another.

Such a connecting channel preferably runs transversely, in particular substantially perpendicularly, to the longitudinal direction of the edge channel.

Furthermore, provision may be made that the edge channel has a constriction and/or an interruption by which the portion of the fluid medium flowing through the edge channel exiting through the fluidic connection from the edge channel into the fluid channel in the operation of the electrochemical device is increased. As a result of such a constriction and/or interruption of the edge channel, the distribution of the flow of the fluid medium to the edge channel on the one hand and to the adjacent fluid channel on the other hand can be set in a desired manner.

The extent of such a constriction and/or interruption in the longitudinal direction of the edge channel is preferably so short that the mechanical support of a gas diffusion layer of the electrochemically active unit of the electrochemical device on the bipolar plate is not impaired by the constriction or interruption.

In another particular embodiment of the invention, provision is made that the fluid channel is of open configuration relative to an electrochemically active unit of the electrochemical device.

In this case, provision is preferably made that the edge channel can be flowed through by a fluid reaction medium in the operation of the electrochemical device.

Such a fluid reaction medium contains at least one electrochemically active species that participates in the electrochemical reactions which occur in the electrochemically active unit adjacent to the bipolar plate.

The fluid reaction medium by which the edge channel can be flowed through may be, in particular, an anode gas or a cathode gas of the electrochemical device.

The fluidic connection may comprise, for example, at least one through-opening that is arranged in a delimiting wall of the edge channel.

Here, provision may be made, in particular, that the through-opening is arranged at least partially on a crest and/or at least partially on a flank of an edge web of the first bipolar plate layer or of the second bipolar plate layer.

The edge channel is preferably delimited by an edge web of the first bipolar plate layer and by an edge web of the second bipolar plate layer.

The bipolar plate in accordance with the invention is suited, in particular, for use in an electrochemical device, which comprises at least one electrochemically active unit and at least one bipolar plate in accordance with the invention. Here, the electrochemically active unit is preferably arranged adjacent to the bipolar plate.

In particular, the bipolar plate preferably has a flow field, which comprises flow field channels that are open toward the electrochemically active unit. It is hereby possible that a fluid reaction medium can travel from the respective flow field to the electrochemically active unit.

A through-opening in an edge web, which delimits the edge channel of the bipolar plate, is preferably produced by a cutting operation, in particular a laser cutting operation, on the bipolar plate, in particular on the first bipolar plate layer or on the second bipolar plate layer.

The electrochemical device may be configured, in particular, as a fuel cell device, preferably as a PEM (polymer electrolyte membrane) fuel cell device, as an electrolysis cell, or as a redox flow battery.

The electrochemically active unit of the electrochemical device preferably comprises a polymer electrolyte membrane (PEM).

The first bipolar plate layer and/or the second bipolar plate layer of the bipolar plate are preferably made of a metallic material.

Further features and advantages of the invention are subject matter of the subsequent description and the graphical representation of exemplary embodiments.

BRIEF DESCRIPTION OF THE DRAWINGS

The same or functionally equivalent elements are provided with the same reference numerals in all Figures.

DETAILED DESCRIPTION OF THE INVENTION

Figure 1:
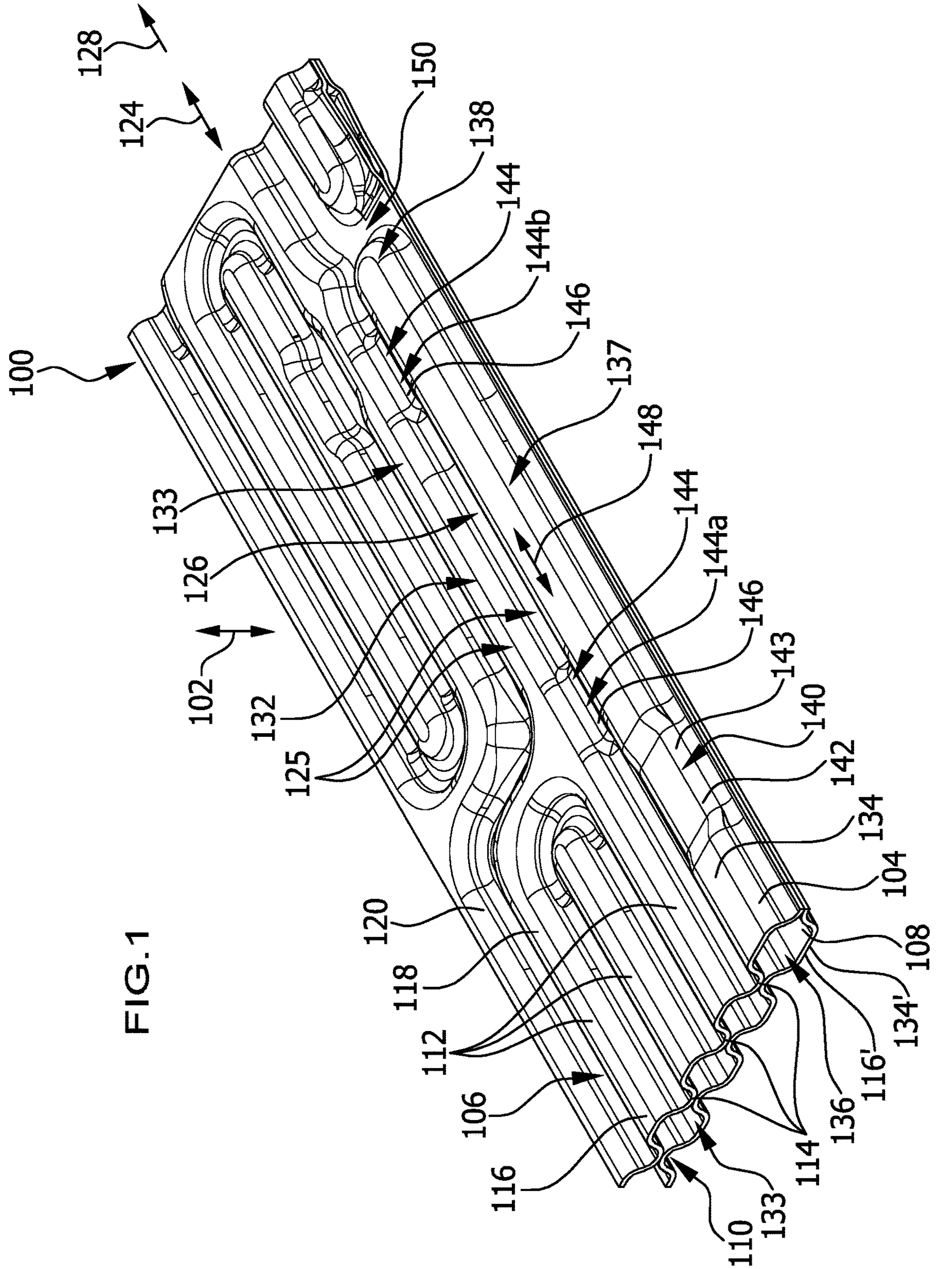
FIG. 1 shows a sectional perspective depiction of a bipolar plate for an electrochemical device, which comprises a first bipolar plate layer and a second bipolar plate layer, between which an edge channel extending along a longitudinal direction is formed, and comprises a fluid channel extending substantially in parallel to the edge channel, wherein the bipolar plate comprises a fluidic connection, through which a fluid medium can flow from the edge channel into the adjacent fluid channel and/or from the adjacent fluid channel into the edge channel, and wherein the fluid channel is of closed configuration relative to an electrochemically active unit of the electrochemical device.

A bipolar plate depicted sectionally in FIGS. 1 to 7 and denoted as a whole with 100 serves as a constituent part for an electrochemical unit of an electrochemical device (not depicted as a whole), for example of a fuel cell stack or an electrolyzer, wherein the electrochemical device comprises a stack, which comprises a plurality of electrochemical units, for example fuel cell units or electrolyzer units, succeeding one another in a stack direction 102, and a clamping device (not depicted) for applying a clamping force, directed in parallel to the stack direction 102, to the electrochemical units.

In this embodiment, the bipolar plate 100 comprises a first bipolar plate layer 104 on which a first flow field 106 for a first fluid reaction medium is formed, and a second bipolar plate layer 108 that is fixed in a fluid-tight manner, for example by a weld seam arrangement, to the first bipolar plate layer 104 and on which a second flow field 110 for a second fluid reaction medium is formed.

The first bipolar plate layer 104 has webs 112 and channel base portions 114 located between two respective webs 112.

Figure 4:
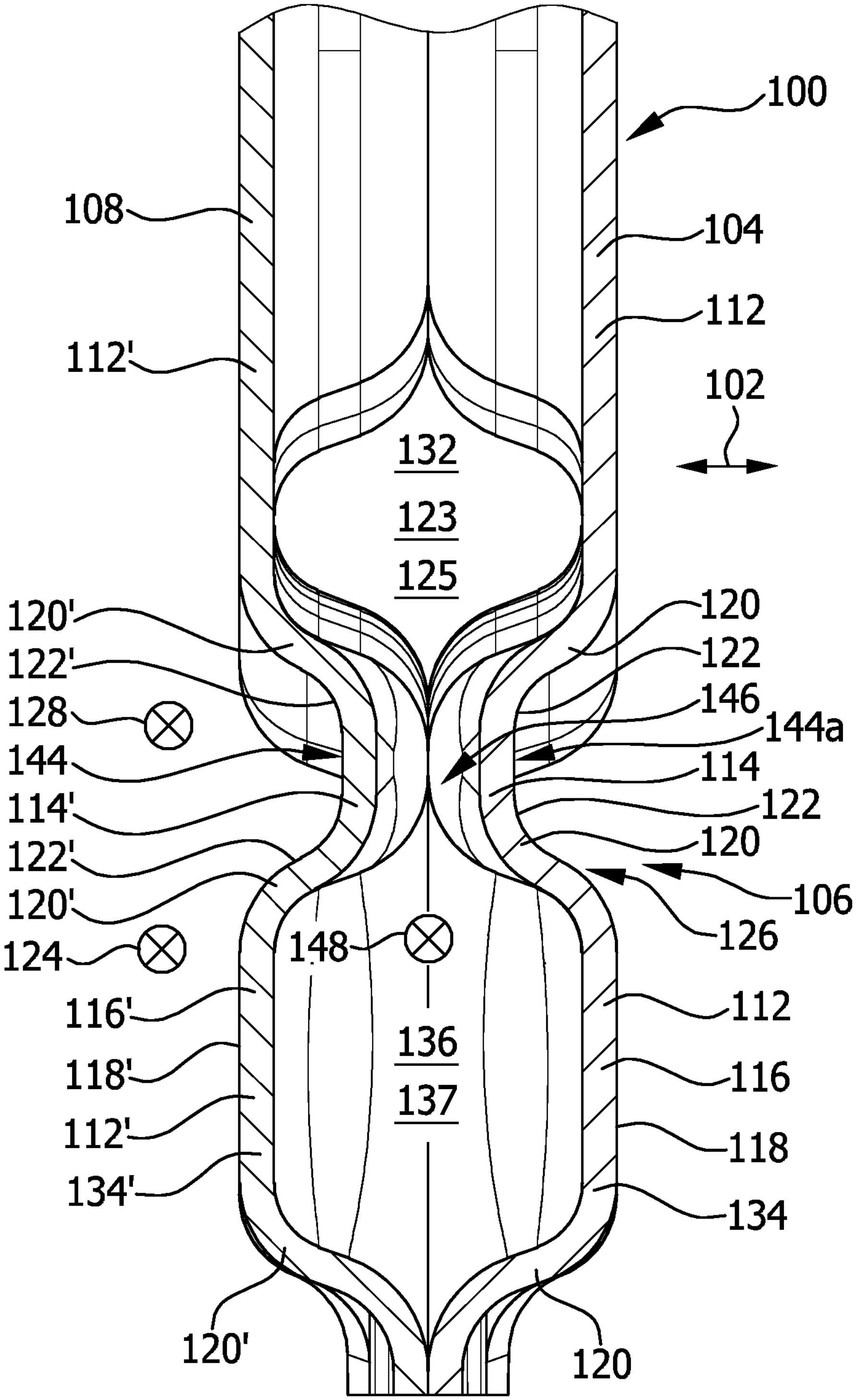
FIG. 4 shows a cross section through the bipolar plate from FIGS. 1 to 3, along line 4 4 in FIG. 2.
Figure 6:
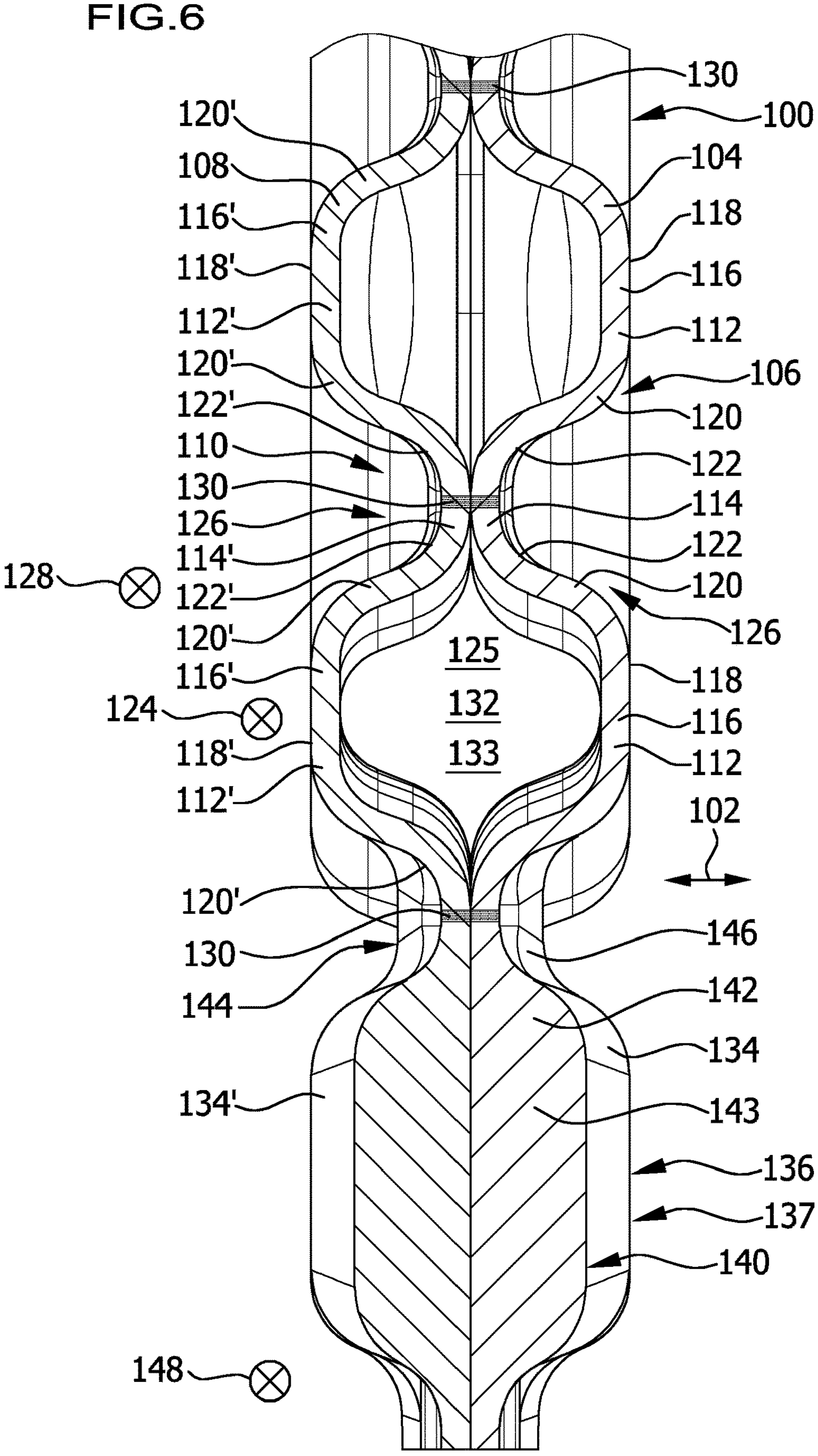
FIG. 6 shows a cross section through the bipolar plate from FIGS. 1 to 5, along line 6 6 in FIG. 2.
Figure 7:
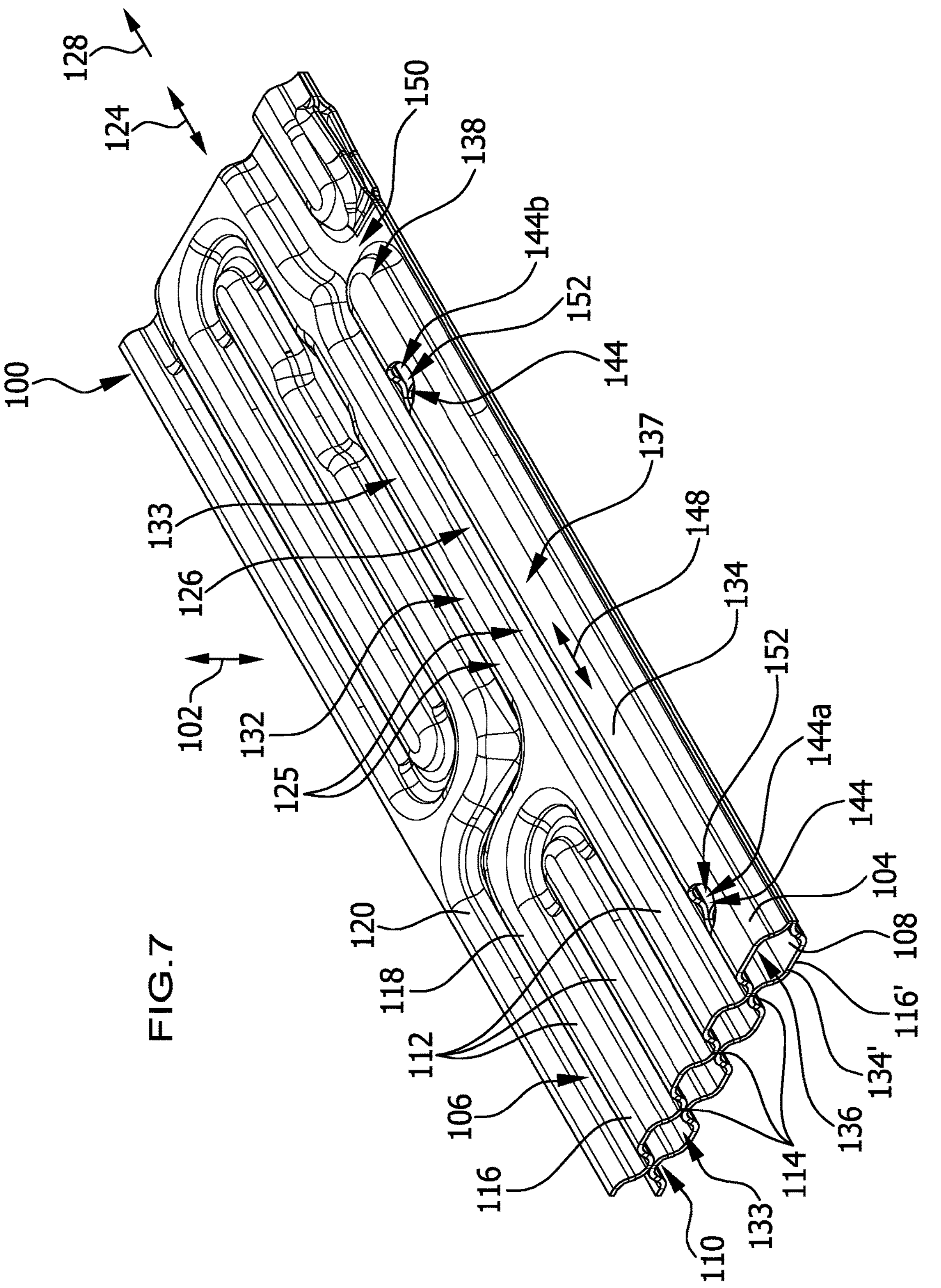
FIG. 7 shows a sectional perspective depiction of a second embodiment of a bipolar plate for an electrochemical device, which comprises a first bipolar plate layer and a second bipolar plate layer, between which an edge channel extending along a longitudinal direction is formed, and comprises a fluid channel extending substantially in parallel to the edge channel, wherein the bipolar plate comprises a fluidic connection, through which a fluid medium can flow from the edge channel into the adjacent fluid channel and/or from the adjacent fluid channel into the edge channel, and wherein the fluid channel is of open configuration relative to an electrochemically active unit of the electrochemical device and through-openings are arranged on a crest and/or on a flank of an edge web of one of the bipolar plate layers.
Figure 8:
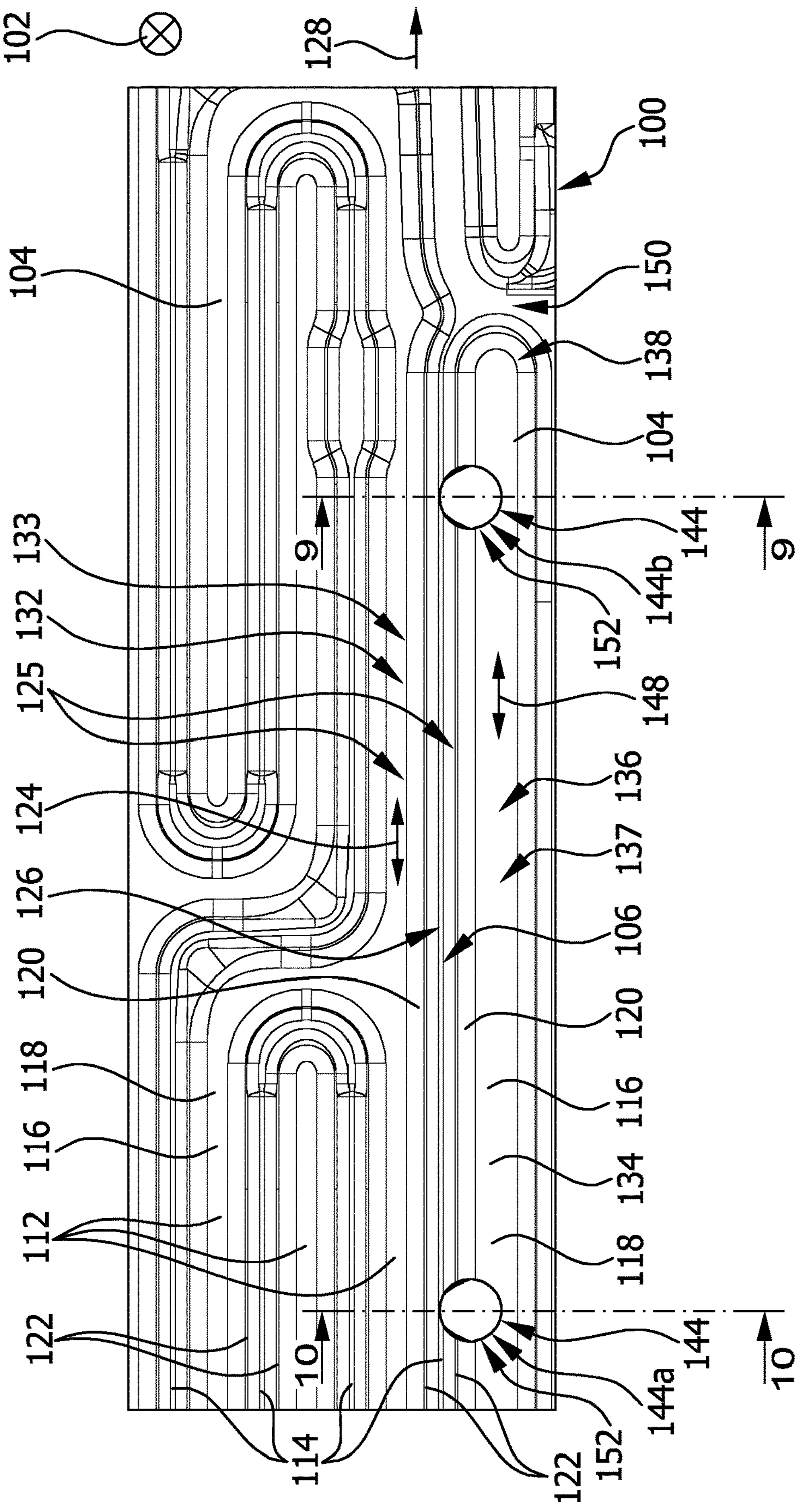
FIG. 8 shows a sectional plan view of the bipolar plate from FIG. 7.
Figure 9:
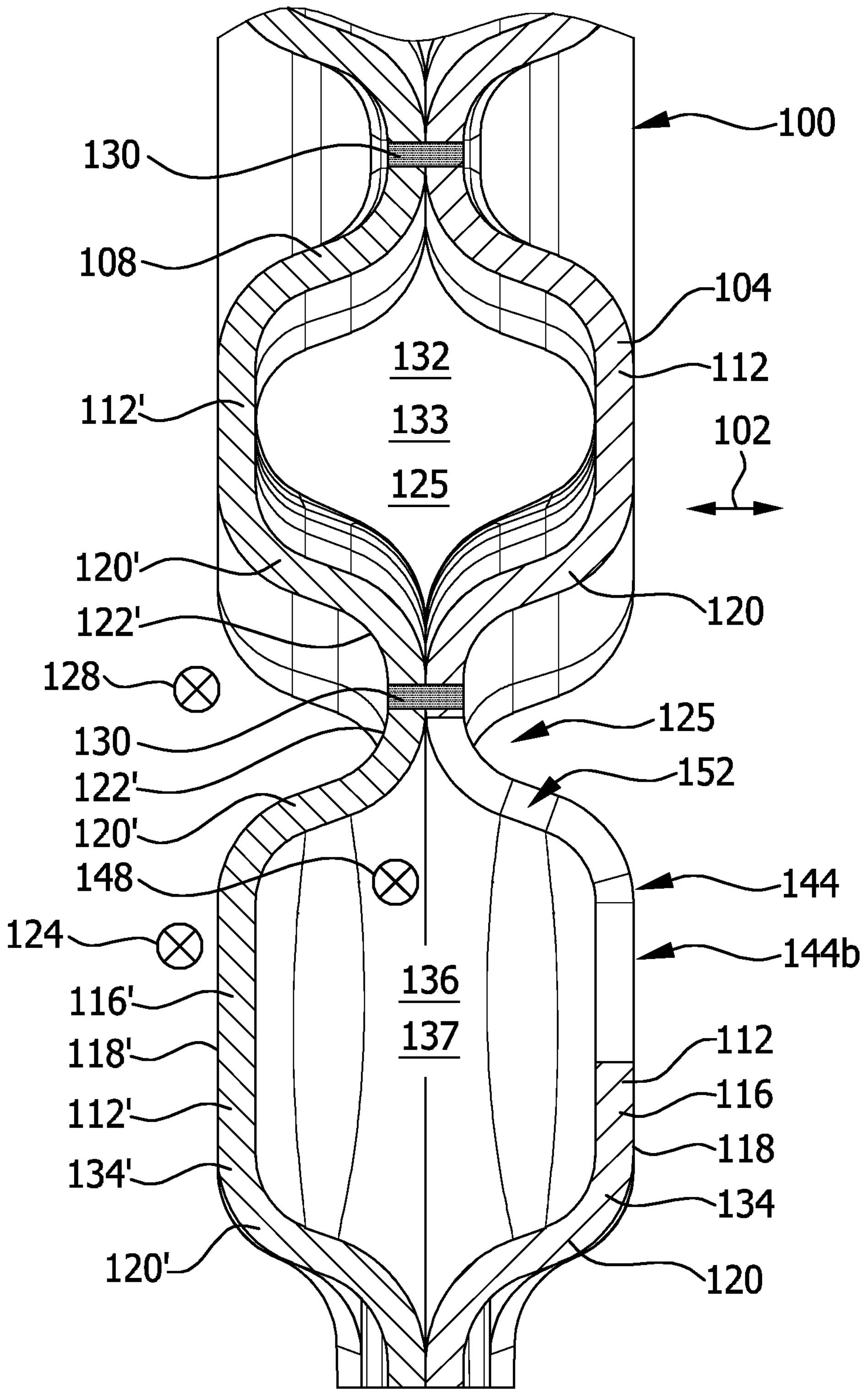
FIG. 9 shows a cross section through the bipolar plate from FIGS. 7 and 8, along line 9 9 in FIG. 8.
Figure 10:
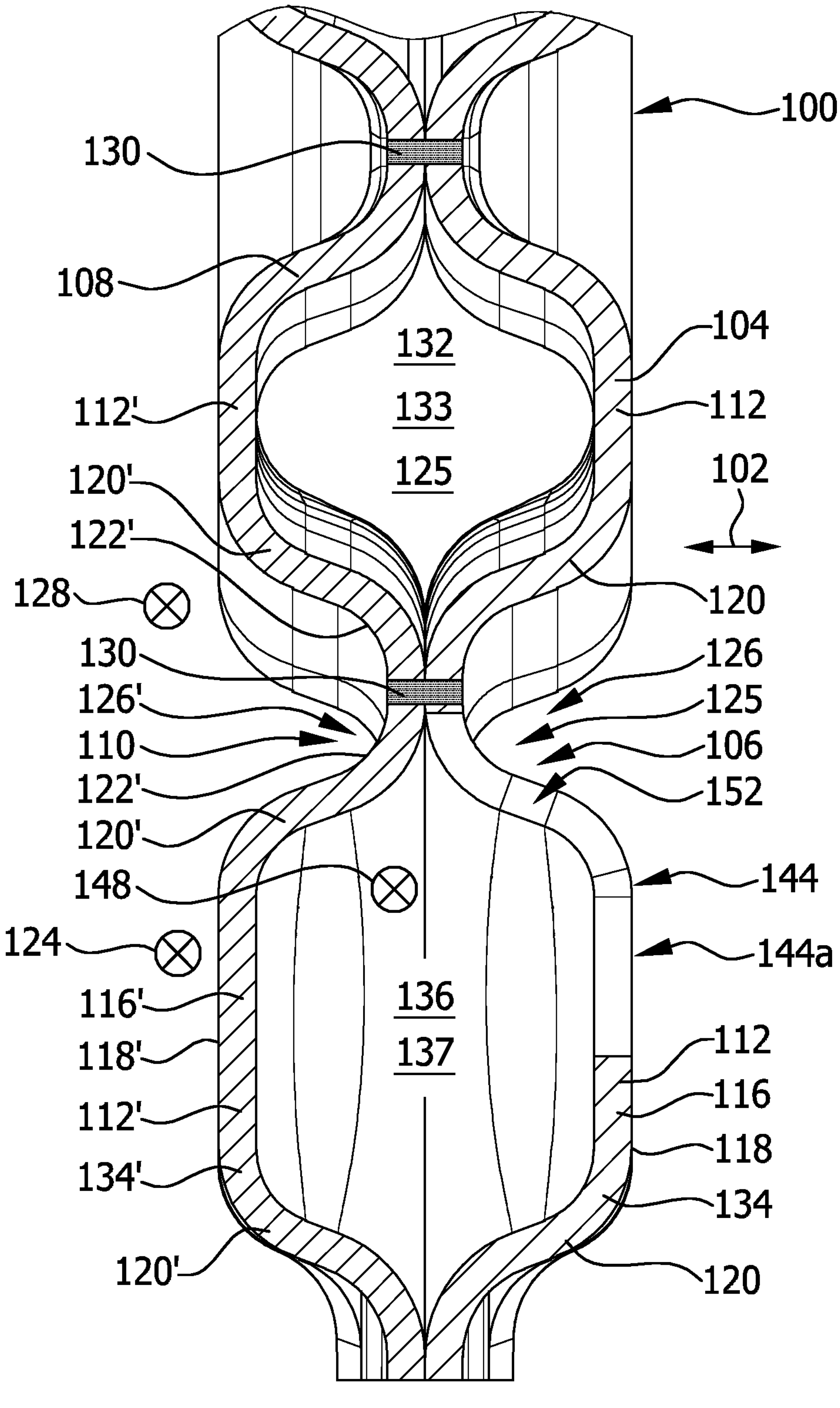
FIG. 10 shows a cross section through the bipolar plate from FIGS. 7 to 9, along line 10 10 in FIG. 8.

As can best be seen in the cross sections of FIGS. 4 and 6, each of the webs 112 has a respective crest 116 with which the respective web 112 abuts against an electrochemically active unit of the electrochemical device adjacent to the bipolar plate 100 in the assembled state of the electrochemical device.

Such an electrochemically active unit may be configured, in particular, as a membrane electrode arrangement (MEA).

Here, each crest 116 abuts with an abutment face 118, which is oriented substantially perpendicular to the stack direction 102, substantially in surface-to-surface contact against a delimiting face, facing toward the bipolar plate 100, of the electrochemically active unit, which is also oriented substantially perpendicular to the stack direction 102.

Furthermore, each web 112 comprises two flanks 120, which are inclined by an acute angle relative to the stack direction 102.

A respective channel base portion 114 of the first bipolar plate layer 104, which connects the two adjacent webs 112 with one another, extends between the outer edges 122, remote from the respective crest 116, of the adjacent webs 112.

Each of the webs 112 extends along a web longitudinal direction 124, which is oriented substantially perpendicular to the stack direction 102.

As can best be seen in FIGS. 4 and 6, two adjacent webs 112 and the channel base portion 114 connecting the two webs 112 to one another, together with the electrochemically active unit (not depicted), each delimit a fluid channel 125 that is a flow field channel 126 of the first flow field 106.

Each flow field channel 126 of the flow field 106 can be flowed through by the first fluid reaction medium, with which the first flow field 106 is associated, along a flow direction 128, which is oriented within a flow field channel 126 substantially in parallel to the web longitudinal directions 124 of the webs 112 of the first flow field 106 delimiting the respective flow field channel 126.

The flow field channels 126 of the first flow field 106 open at their upstream end (not depicted) in a medium supply region of the first flow field 106 and at their downstream end in a medium discharge region of the first flow field 106.

In the operation of the electrochemical device, the first fluid reaction medium, with which the first flow field 106 is associated, enters through a medium supply channel (which preferably extends substantially in parallel to the stack direction 102 and is not depicted) into the medium supply region of the first flow field 106, from where it is distributed to the different flow field channels 126 of the first flow field 106 and flows through same along the flow direction 128.

The first fluid reaction medium may be, in particular, an anode gas or a cathode gas for the electrochemical device.

The first fluid reaction medium travels from the flow field channels 126 to the electrochemically active unit, where the respective electrochemically active species from the first fluid reaction medium is consumed in the course of the electrochemical reactions occurring in the electrochemically active unit, such that the concentration of the electrochemically active species in the first fluid reaction medium flowing through the flow field channels 126 decreases along the flow direction 128.

The first bipolar plate layer 104 and the second bipolar plate layer 108 are connected to one another in a fluid-tight manner along one or more joint lines 130.

In principle, any material joining method comes into consideration for the production of the at least one joint line 130.

In particular, provision may be made that the joint line 130 is a solder line, a weld line, or an adhesive line, or is formed by a bead of a, preferably elastomeric, seal material.

A joint line 130 may be produced, in particular, by a laser welding operation on the bipolar plate 100.

Closed fluid channels 132 for a further fluid medium are formed between the first bipolar plate layer 104 and the second bipolar plate layer 108.

This further fluid medium may be different from the first fluid reaction medium with which the first flow field 106 is associated.

The further fluid medium may be, in particular, a cooling medium for cooling the electrochemical device. The closed fluid channels 132 formed between the first bipolar plate layer 104 and the second bipolar plate layer 108 are cooling medium channels 133 in this case.

The closed fluid channels 132 that can be flowed through by the further fluid medium are of closed configuration relative to the electrochemically active unit, such that the further fluid medium, in particular the cooling medium, cannot enter the electrochemically active unit from the closed fluid channels 132.

The second bipolar plate layer 108 also has webs 112' and channel base portions 114' located between two respective webs 112'.

Each of the webs 112' has a respective crest 116', with which the web 112' abuts against an electrochemically active unit (not depicted) of a further electrochemical unit of the electrochemical device adjacent to the bipolar plate 100.

Each crest 116' abuts with an abutment face 118', which is oriented substantially perpendicular to the stack direction 102, substantially in surface-to-surface contact against a delimiting face, facing toward the bipolar plate 100, of the electrochemically active unit of the adjacent electrochemical unit, which is also oriented substantially perpendicular to the stack direction 102.

Furthermore, each web 112' comprises two flanks 120', which are inclined by an acute angle relative to the stack direction 102.

A respective channel base portion 114' of the second bipolar plate layer 108, which connects the two adjacent webs 112' with one another, extends between the outer edges 122', remote from the respective crest 116', of two adjacent webs 112'.

Each of the webs 112' extends along the web longitudinal direction 124, which is oriented substantially perpendicular to the stack direction 102.

An edge web 134 running on the outer edge of the first bipolar plate layer 104 and an edge web 134' located opposite said edge web 134 and running along the edge of the second bipolar plate layer 108 together delimit an edge channel 136 of the bipolar plate 100 formed between the edge webs 134 and 134'.

Figure 2:
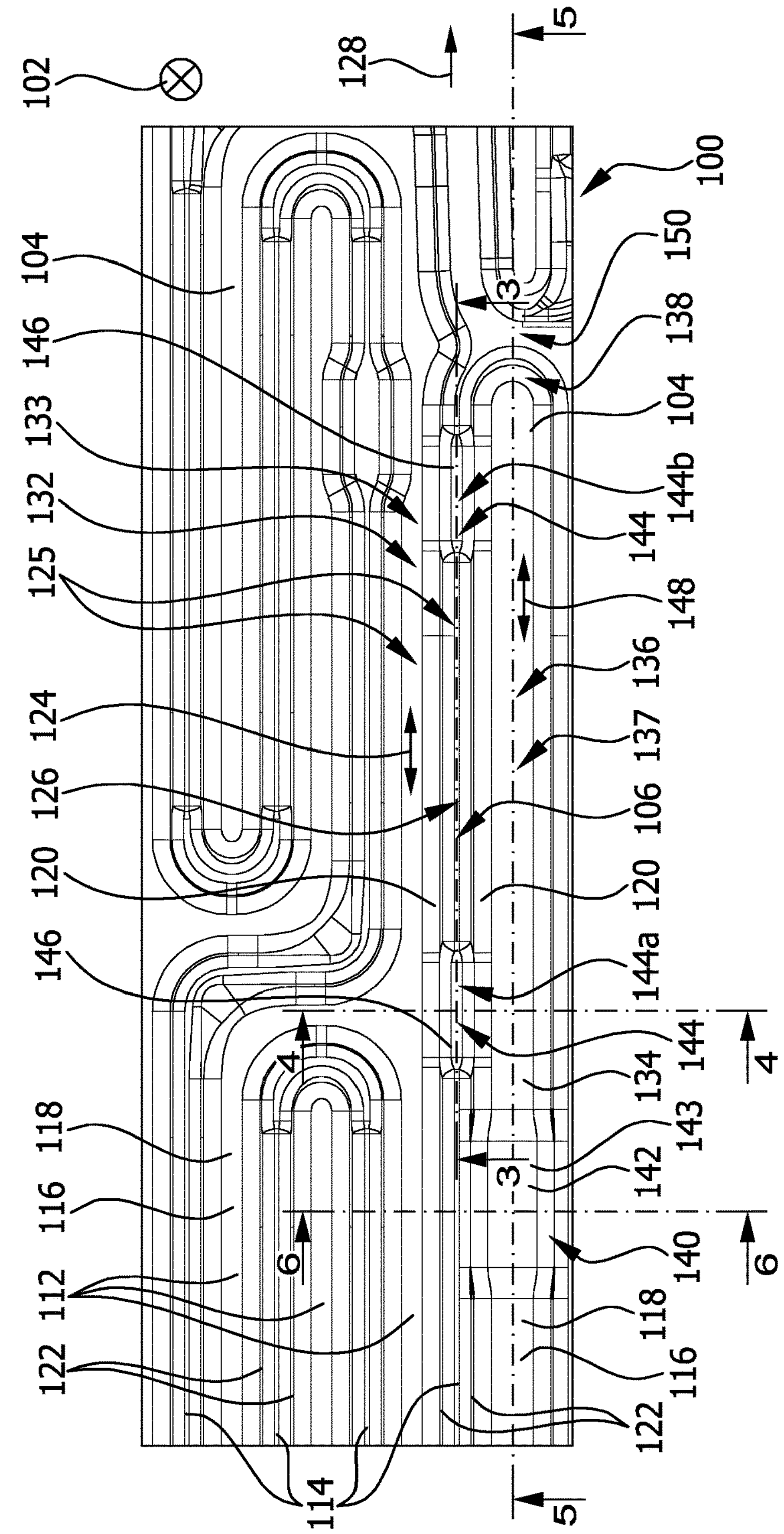
FIG. 2 shows a sectional plan view of the bipolar plate from FIG. 1.

As can best be seen in FIGS. 1 and 2, the edge channel 136 comprises an edge channel portion 137, which runs from a first end region 138 at which the edge channel 136 is closed in a fluid-tight manner, along the web longitudinal direction 124, up to a second end region 140.

At the first end region 138, the edge channel 136 is closed by the edge webs 134 and 134' being lowered so far that they contact one another to form a medium passage 150, through which the first fluid reaction medium and/or the second fluid reaction medium can enter transversely to the longitudinal direction 148 of the edge channel 136 into the respectively associated first flow field 106 or second flow field 110.

In the depicted embodiment, the edge webs 134 and 134' are lowered in the second end region 140 as well, such that a constriction 142 in the cross section of the edge channel 136 that can be flowed through is formed.

Figure 5:
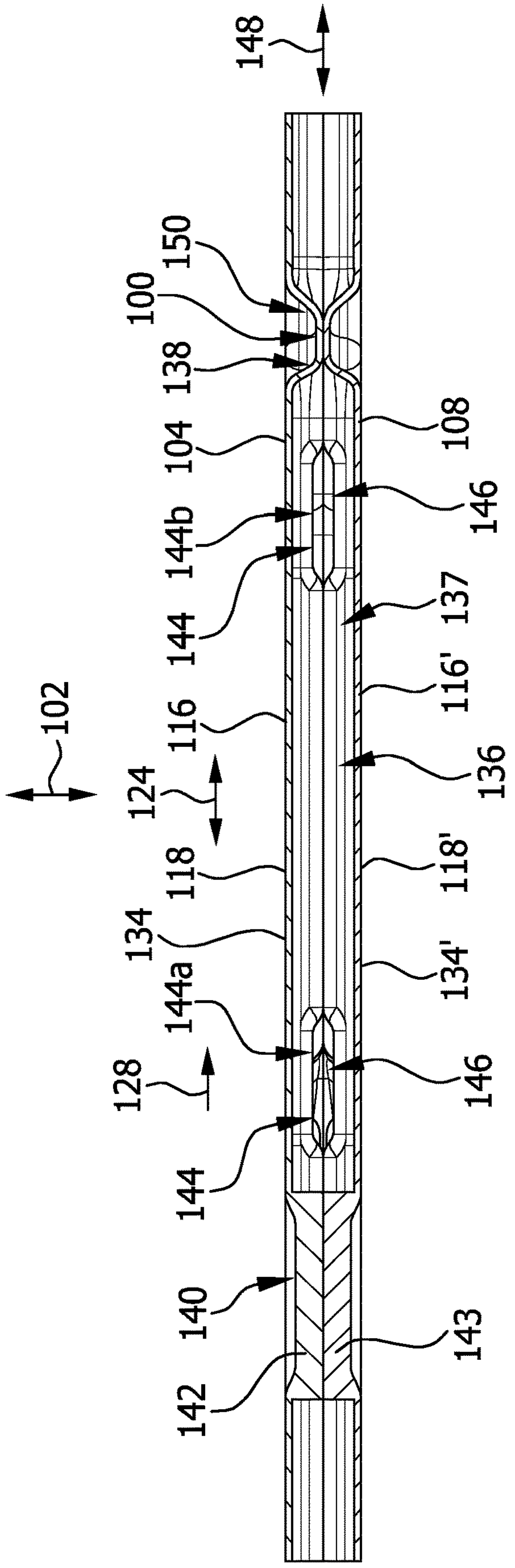
FIG. 5 shows a longitudinal section through the bipolar plate from FIGS. 1 to 4, along line 5 5 in FIG. 2.

As can be seen from the longitudinal section of FIG. 5, the edge webs 134 and 134' may abut against one another in the region of the construction 142, for example due to a material thickening, such that the cross section of the edge channel 136 that can be flowed through is reduced down to zero in the region of the constriction 142. In this case, the constriction 142 forms an interruption 143 of the edge channel 136, and the edge channel 136 can be flowed through by the further fluid medium, in particular the cooling medium, only in the edge channel portion 137, between the first end region 138 and the second end region 140.

The bipolar plate 100 further comprises one or more fluidic connections 144, for example a first fluidic connection 144*a* and a second fluidic connection 144*b*, by which the edge channel 136 is connected to the adjacent closed fluid channel 132, such that the first fluid medium, in particular the cooling medium, can flow from the edge channel 136 into the adjacent closed fluid channel 132 or from the adjacent closed fluid channel 132 into the edge channel 136.

Figure 3:
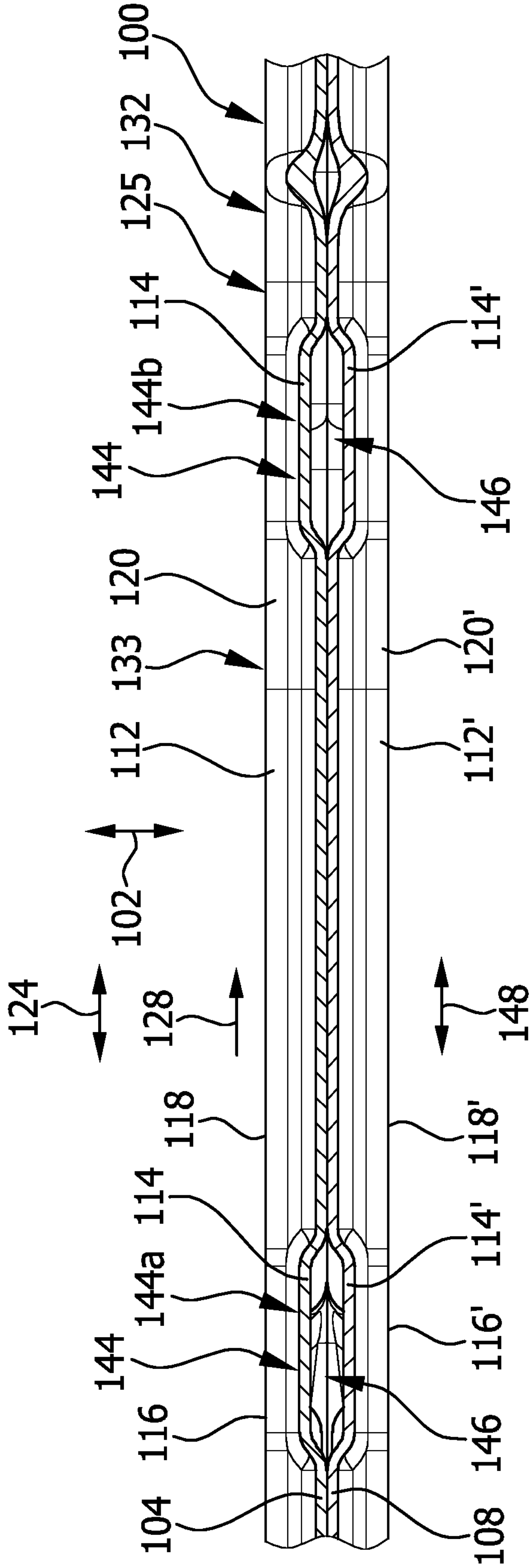
FIG. 3 shows a longitudinal section through the bipolar plate from FIGS. 1 and 2, along line 3 3 in FIG. 2.

As can best be seen from the longitudinal section of FIG. 3, the fluidic connections 144*a*, 144*b* are formed by the channel base portions 114, 114' of the first bipolar plate layer 104 and the second bipolar plate layer 108, respectively, being raised in the stack direction 102 in the region of the fluidic connections 144*a* and 144*b*, such that in these regions the first bipolar plate layer 104 and the second bipolar plate layer 108 are spaced at a distance from one another along the stack direction 102 and form a connecting channel 146 between them, which is oriented transversely, preferably substantially perpendicularly, to the longitudinal direction 148 of the edge channel 136, which corresponds to the web longitudinal direction 124 of the edge webs 134 and 134'.

By means of the fluidic connections 144*a* and 144*b* between the edge channel 136 and the adjacent closed fluid channel 132, the flow of this fluid medium can be divided between the fluid channel 132 and the edge channel 136 in a desired manner in order to, for example, guide the further fluid, in particular the cooling medium, past regions of the first flow field 106 or the second flow field 110 in sections, which are connected to electrochemically active regions of adjacent electrochemically active units, and to feed said further fluid into an adjacent fluid channel at other points in a defined manner in order to achieve a higher cooling effect at the feed-in points.

The first embodiment of a bipolar plate 100 depicted in FIGS. 1 to 6 makes it possible, in particular, to influence the flow of the further fluid medium, in particular the cooling medium, through the bipolar plate 100 in a desired manner.

A second embodiment of the bipolar plate 100 depicted in FIGS. 7 to 10 differs from the first embodiment depicted in FIGS. 1 to 6 in that the edge channel 136 is not in fluidic connection with an adjacent closed fluid channel 132, but rather with the adjacent flow field channel 126, which is open toward the electrochemically active unit.

To this end, the edge channel 136 in this embodiment has one or more fluidic connections 144, for example a first fluidic connection 144*a* and a second fluidic connection 144*b*, which are configured as through-openings 152 that are arranged, for example, on the edge web 134 of the first bipolar plate layer 104.

In particular, provision may be made that such a through-opening 152 is arranged at least partially on the crest 116 and/or at least partially on one of the flanks 120 of the edge web 134 of the first bipolar plate layer 104.

In this embodiment of the bipolar plate 100, the first fluid reaction medium, which flows through the first flow field 106, can thus flow at the fluidic connections 144*a* and 144*b* from the flow field channel 126, which is adjacent to the edge channel 136, into the edge channel 136 and/or from the edge channel 136 into the flow field channel 126, which is adjacent to the edge channel 136.

The edge channel 136 can thereby be used to influence the distribution of the first fluid reaction medium over the first flow field 106.

The connecting channels 146 between the edge channel 136 and the adjacent closed fluid channel 132, which is flowed through by the further fluid medium, in particular by the cooling medium, are omitted in this embodiment.

The constriction 142 or interruption 143 of the edge channel 136 described above in the context of the first embodiment may be omitted or be used in this second embodiment to influence the flow of the first fluid reaction media through the edge channel 136.

In all other respects, the second embodiment depicted in FIGS. 7 to 10 of a bipolar plate 100 for an electrochemical device corresponds with respect to structure, function, and production method with the first embodiment depicted in FIGS. 1 to 6, to the preceding description of which reference is made in this regard.

The invention claimed is:

1. A bipolar plate for an electrochemical device, comprising at least one first bipolar plate layer and one second bipolar plate layer, between which an edge channel extending along a longitudinal direction is formed, and a fluid channel running substantially in parallel to the edge channel, wherein the bipolar plate comprises at least one fluidic connection through which a fluid medium can flow at least one of a) from the edge channel into an adjacent fluid channel and b) from the adjacent fluid channel into the edge channel, wherein the fluid channel is of closed configuration relative to an electrochemical unit of the electrochemical device and wherein the fluidic connection comprises a connecting channel, which is delimited by a channel base portion of the first bipolar plate layer connecting two adjacent webs of the first bipolar plate layer to one another and by a channel base portion of the second bipolar plate layer connecting two adjacent webs of the second bipolar plate layer to one another, wherein the first bipolar plate layer, and the second bipolar plate layer in the region of the connecting channel are spaced at a distance from one another along a stack direction of the electrochemical device, wherein the first bipolar plate layer and the second bipolar plate layer abut each other adjacent to the connecting channel and wherein each of said webs of the first bipolar plate layer and the second bipolar plate layer, respectively, comprises two flanks which are inclined by an acute angle relative to the stack direction along which a plurality of bipolar plates follow each other in the electrochemical device wherein said webs of the first bipolar plate layer and the channel base portion connecting these webs to one another delimit a flow field channel of a first flow field, wherein the flow field channel opens at its upstream end in a medium supply region of the first flow field and wherein, in the operation of the electrochemical device, a first fluid reaction medium enters through a medium supply channel into the medium supply region of the first flow field.

2. The bipolar plate in accordance with claim 1, wherein the edge channel can be flowed through by a cooling medium in the operation of the electrochemical device.

3. The bipolar plate in accordance with claim 1, wherein the connecting channel runs transversely to the longitudinal direction of the edge channel.

4. The bipolar plate in accordance with claim 1, wherein the edge channel has at least one of a constriction and an interruption by which the portion of the fluid medium flowing through the edge channel exiting through the fluidic connection from the edge channel into the fluid channel in the operation of the electrochemical device is increased.

5. The bipolar plate in accordance with claim 1, wherein the edge channel can be flowed through by a fluid reaction medium in the operation of the electrochemical device.

6. An electrochemical device, comprising at least one bipolar plate and at least one electrochemically active unit, which is in contact with the bipolar plate, the at least one bipolar plate comprising at least one first bipolar plate layer and one second bipolar plate layer, between which an edge channel extending along a longitudinal direction is formed, and a fluid channel running substantially in parallel to the edge channel, wherein the bipolar plate comprises at least one fluidic connection through which a fluid medium can flow at least one of a) from the edge channel into an adjacent fluid channel and b) from the adjacent fluid channel into the edge channel, wherein the fluid channel is of closed configuration relative to an electrochemical unit of the electrochemical device and wherein the fluidic connection comprises a connecting channel, which is delimited by a channel base portion of the first bipolar plate layer connecting two adjacent webs of the first bipolar plate layer to one another and by a channel base portion of the second bipolar plate layer connecting two adjacent webs of the second bipolar plate layer to one another, wherein the first bipolar plate layer, and the second bipolar plate layer in the region of the connecting channel are spaced at a distance from one another along a stack direction of the electrochemical device, wherein the first bipolar plate layer and the second bipolar plate layer abut each other adjacent to the connecting channel and wherein each of said webs of the first bipolar plate layer and the second bipolar plate layer, respectively, comprises two flanks which are inclined by an acute angle relative to the stack direction along which a plurality of bipolar plates follow each other in the electrochemical device wherein said webs of the first bipolar plate layer and the channel base portion connecting these webs to one another delimit a flow field channel of a first flow field, wherein the flow field channel opens at its upstream end in a medium supply region of the first flow field and wherein, in the operation of the electrochemical device, a first fluid reaction medium enters through a medium supply channel into the medium supply region of the first flow field.

* * * * *